United States Patent [19]

Steeby et al.

[11] Patent Number: 5,766,111
[45] Date of Patent: Jun. 16, 1998

[54] AUTOMODE-TO-NEUTRAL LOGIC

[75] Inventors: Jon A. Steeby, Schoolcraft; Daniel P. Janecke, Kalamazoo; Warren R. Dedow, Portage, all of Mich.

[73] Assignee: Eaton Corporation, Cleveland, Ohio

[21] Appl. No.: 796,006

[22] Filed: Feb. 5, 1997

[51] Int. Cl.⁶ .................................................. F16H 59/18
[52] U.S. Cl. ............................ 477/124; 477/111; 701/52
[58] Field of Search ................................. 477/123, 124, 477/111; 701/52

[56] References Cited

U.S. PATENT DOCUMENTS

| | | | |
|---|---|---|---|
| 4,361,060 | 11/1982 | Smyth et al. | 74/866 |
| 4,551,802 | 11/1985 | Smyth | 364/424.1 |
| 4,595,986 | 6/1986 | Daubenspeck et al. | 364/424.1 |
| 4,722,248 | 2/1988 | Braun | 74/866 |
| 4,754,665 | 7/1988 | Vandervoort | 74/745 |
| 4,850,236 | 7/1989 | Braun | 74/337 |
| 4,920,815 | 5/1990 | Reynolds | 74/335 |
| 4,930,078 | 5/1990 | Dunkley et al. | 701/52 |
| 5,000,060 | 3/1991 | Reynolds et al. | 74/745 |
| 5,038,627 | 8/1991 | Schwaiger et al. | 74/335 |
| 5,089,965 | 2/1992 | Braun | 701/52 |
| 5,390,561 | 2/1995 | Stine | 74/331 |
| 5,393,276 | 2/1995 | White et al. | 477/91 |
| 5,393,277 | 2/1995 | White et al. | 477/108 |
| 5,435,212 | 7/1995 | Menig | 74/745 |
| 5,498,195 | 3/1996 | White et al. | 477/110 |
| 5,673,592 | 10/1997 | Huggins et al. | 701/52 |

*Primary Examiner*—Dirk Wright
*Attorney, Agent, or Firm*—Howard D. Gordon

[57] ABSTRACT

A partially automated mechanical transmission system (92) includes a splitter-type compound transmission (10) and controls for automating splitter shifting upon manual selection of the highest main section ratio position (ninth/tenth). Logic is provided to provide an optimized response to manual shifting into main section neutral from the highest main section ratio position.

20 Claims, 6 Drawing Sheets

GEAR RATIOS

| SPEED | RATIO | % STEP |
|---|---|---|
| 10 | 0.75 | 33% |
| 9 | 1.00 | 33% |
| 8 | 1.33 | 33% |
| 7 | 1.78 | 33% |
| 6 | 2.37 | 33% |
| 5 | 3.16 | 33% |
| 4 | 4.22 | 33% |
| 3 | 5.63 | 33% |
| 2 | 7.51 | 33% |
| 1 | 10.01 | |
| R HI | 9.30 | |
| R LO | 12.38 | |

OVERALL RATIO 13:1

SHIFT PATTERN

| R LO | 3 | 7 |
| R HI | 4 | 8 |
| 1 | 5 | 9 |
| 2 | 6 | 10 |

LOW RANGE — HIGH RANGE

Fig.2 PRIOR ART

VALVE TABLE

| GEAR | S #1 | S #2 |
|---|---|---|
| 1 – 8 | OFF | OFF |
| 9 | ON | OFF |
| 10 | OFF/ON | ON |

Fig.4

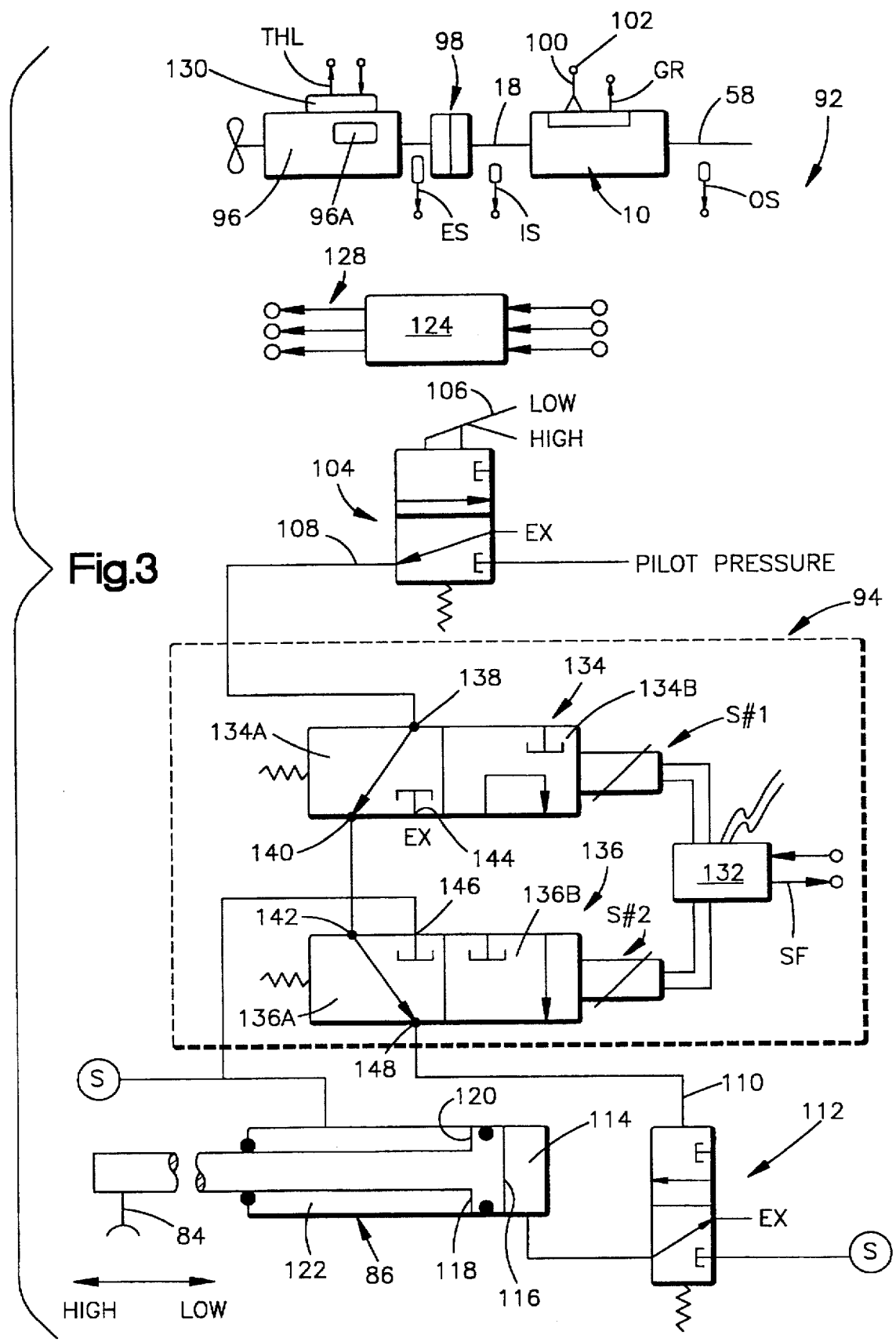

AUTOMODE-TO-NEUTRAL LOGIC

BACKGROUND OF THE INVENTION

RELATED APPLICATIONS

This application is related to the following co-pending U.S. applications, all assigned to EATON CORPORATION, the assignee of this application:

Ser. No. 08/439,908, still pending
Filed: May 12, 1995
Title: AUTOMATIC AND MANUAL SPLITTER SHIFTING CONTROL VALVE ASSEMBLY Ser. No. 08/649,829, now U.S. Pat. No. 5,682,790
Filed: Apr. 30, 1996
Title: SYNCHRONIZING AND GEAR ENGAGEMENT SENSING LOGIC FOR AUTOMATED MECHANICAL TRANSMISSION SYSTEMS Ser. No. 08/795,918, pending
Filed: Feb. 5, 1997
Title: AUTOMATED TRANSMISSION SYSTEM POWER-DOWN Ser. No. 08/796,001, now allowed
Filed: Feb. 5, 1997
Title: SENSING MANUAL SHIFT INTO AUTOMATED UPPER RATIOS Ser. No. 08/795,616, pending
Filed: Feb. 5, 1997
Title: ANTI-HUNT LOGIC Ser. No. 08/795,615, pending
Filed: Feb. 2, 1997
Title: DISENGAGEMENT CONFIRMATION Ser. No. 08/790,210, pending
Filed: Feb. 5, 1997
Title: ENGAGEMENT OF GEAR RATIO CONFIRMATION Ser. No. 08/790,209, pending
Filed: Feb. 5, 1997
Title: TRANSITION TO DEGRADED MODE OF OPERATION

FIELD OF THE INVENTION

The present invention relates to controls for partially automated transmission systems having automatic shifting in only the upper grouping of ratios and requiring manual shifting into the upper grouping of ratios. In particular, the present invention relates to controls for a splitter-type partially automated transmission having automatic splitter shifting in only the upper main section gear ratio position and requiring manual shifting into and from said upper main section gear ratio position to activate and deactivate, respectively, the automatic splitter shifting function. More particularly, the present invention relates to control logic rules for most effectively responding to a manual shift from the automatic splitter shifting position into main section neutral under various operating conditions.

DESCRIPTION OF THE PRIOR ART

Partially automated vehicular transmission systems requiring manual shifting in the lower ratios and having a control for automated shifting in the upper ratios are known in the prior art, as may be seen by reference to U.S. Pat. Nos. 4,722,248; 4,850,236; 5,038,627; 5,393,276; 5,393,277 and 5,498,195, the disclosures of which are incorporated herein by reference.

Partially automated transmission systems having automatic splitter shifting and manual main section shifting are known in the prior art, as may be seen by reference to U.S. Pat. No. 5,435,212, the disclosures of which are incorporated herein by reference.

Splitter and combined range and splitter-type compound vehicular transmissions requiring manual splitter shifting are well known in the prior art, as may be seen by reference to U.S. Pat. Nos. 3,799,002; 4,754,665; 4,974,468; 5,000,060; 5,370,013 and 5,390,561, the disclosures of which are incorporated herein by reference.

SUMMARY OF THE INVENTION

In accordance with the present invention, a new and improved partially automated vehicular transmission system requiring manual shifting in the lower ratios and having a control for automated shifting in the upper ratios is provided.

The foregoing is accomplished by providing logic rules for responding to a manual shift into main section neutral from the automatic splitter shifting position, i.e., from the highest main section ratio position, in a manner deemed most appropriate under sensed vehicle operating conditions. At below a certain vehicle speed (usually sensed as a transmission output shaft speed), a shift from the automatic splitter shifting position into main section neutral will cause the automatic shifting controls, including the fueling controls, to be deactivated, while under other conditions, the splitter is shifted to the ratio most likely to be desired by the operator (and appropriate for the present vehicle speed) and the operator is given manual control of engine fueling.

Accordingly, it is an object of the present invention to provide a new and improved partially automated mechanical transmission system.

This and other objects and advantages of the present invention will become apparent from a reading of the following description of the preferred embodiment taken in connection with the attached drawings.

BRIEF DESCRIPTION OF THE DRAWINGS

FIG. 2 is a schematic illustration of the manual shift pattern and ratio steps for the transmission of FIGS. 1 and 1A.

FIG. 3 is a schematic illustration of a partially automated vehicular mechanical transmission system having both manual and automatic splitter shifting and utilizing the control of the present invention.

FIG. 4 is a valve table for the control valve assembly utilized in the system of FIG. 3.

DESCRIPTION OF THE PREFERRED EMBODIMENT

Figure 1:
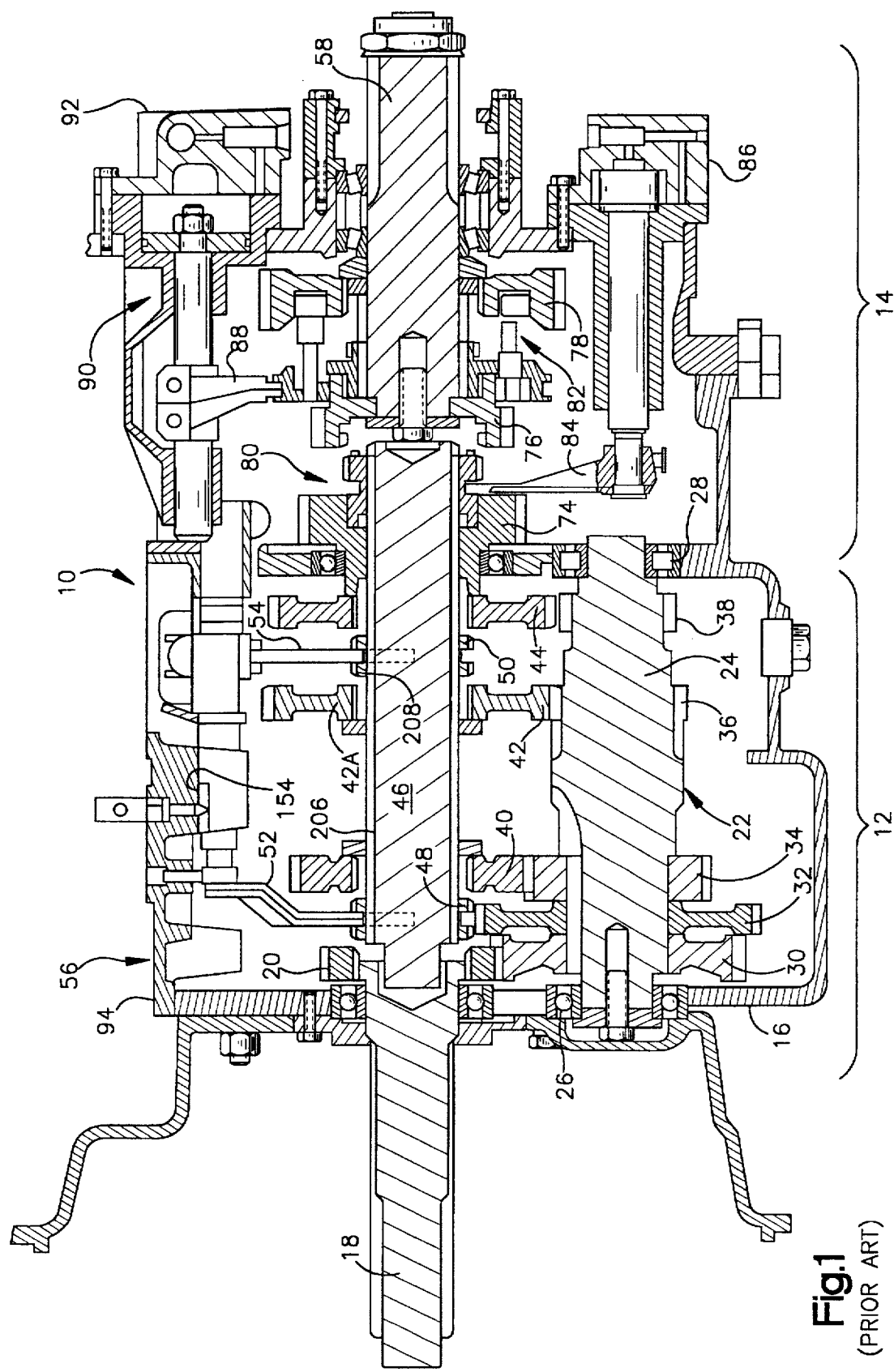
FIGS. 1 and 1A are sectional views of a typical splitter or combined splitter and range-type compound transmission.
Figure 1A:
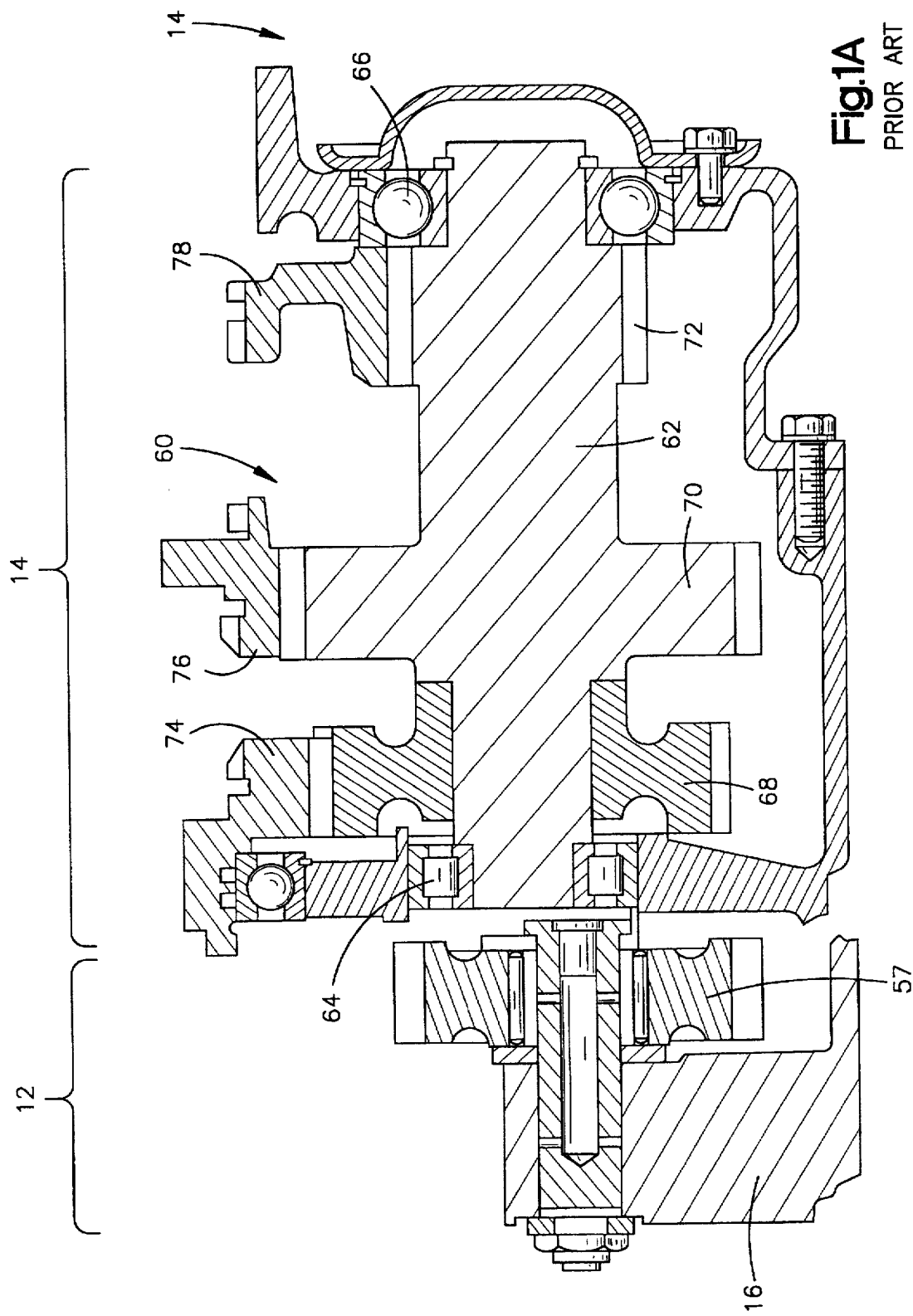

FIGS. 1, 1A and 2 illustrate a typical combined splitter and range-type compound mechanical transmission 10 of the type advantageously utilized in connection with the control of the present invention.

Transmission 10 comprises a main transmission section 12 connected in series with an auxiliary transmission section 14 having both range and splitter-type gearing. Typically, transmission 10 is housed within a single multi-piece housing 16 and includes an input shaft 18 driven by a prime mover (such as a diesel engine) through a selectively disengaged, normally engaged friction master clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are hereby incorporated by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or main shaft gears 40, 42 and 44 surround the transmission main shaft 46 and are selectively clutchable, one at a time, to the main shaft 46 for rotation therewith by sliding clutch collars 48 and 50, as is well known in the art. Clutch collar 48 may also be utilized to clutch input gear 20 to the main shaft 46 to provide a direct drive relationship between the input shaft 18 and the main shaft 46. Preferably, each of the main section main shaft gears encircles the main shaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56 of the type illustrated in U.S. Pat. Nos. 4,920,815 and 5,000,060. Clutch collars 48 and 50 are, in the preferred embodiment, of the well-known, non-synchronized, double-acting jaw clutch type.

Main section main shaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are 3-position clutches in that they may be positioned in a centered axially non-displaced, non-engaged position as illustrated or in a fully rightwardly engaged or fully leftwardly engaged position.

Auxiliary transmission section 14 is connected in series with main transmission section 12 and is of the 3-layer, 4-speed combined splitter/range type, as illustrated in above-mentioned U.S. Pat. No. 4,754,665. Main shaft 46 extends into the auxiliary section 14 and is journaled in the inward end of the output shaft 58 which extends from the rearward end of the transmission.

Auxiliary transmission section 14 includes, in the preferred embodiment thereof, a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of main shaft 46. Auxiliary section countershaft gears 72 constantly mesh with and support auxiliary section range gear 78, which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range-type auxiliary transmission section 14.

A sliding 2-position jaw clutch collar 80 is utilized to selectively couple either the splitter gear 74 or the splitter/range gear 76 to the main shaft 46, while a 2-position synchronized clutch assembly 82 is utilized to selectively couple the splitter/range gear 76 or the range gear 78 to the output shaft 58.

The splitter jaw clutch 80 is a 2-position clutch assembly which may be selectively positioned in the rightwardmost or leftwardmost positions for engaging either gear 76 or gear 74, respectively, to the main shaft 46. Splitter jaw clutch 80 is axially positioned by means of a shift fork 84 controlled by a 2-position piston actuator 86, which normally is operable by a driver selection switch such as a button or the like on the shift knob, as is known in the prior art. Two-position synchronized range clutch assembly 82 is also a 2-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a 2-position piston device 90, the actuation and control of which is described in greater detail in aforementioned U.S. Pat. No. 4,974,468.

As may be seen by reference to FIGS. 1–2, by selectively axially positioning both the splitter clutch 80 and the range clutch 82 in the forward and rearward axial positions thereof, four distinct ratios of main shaft rotation to output shaft rotation may be provided. Accordingly, auxiliary transmission section 14 is a 3-layer auxiliary section of the combined range and splitter type providing four selectable speeds or drive ratios between the input (main shaft 46) and output (output shaft 58) thereof. The main section 12 provides a reverse and three potentially selectable forward speeds. However, one of the selectable main section forward gear ratios, the low speed gear ratios associated with main shaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

While clutch 82 (the range clutch) should be a synchronized clutch, double-acting clutch collar 80 (the splitter clutch) is not required to be synchronized. The shift pattern for manually shifting transmission 10 is schematically illustrated in FIG. 2. Divisions in the vertical direction at each gear lever position signify splitter shifts, while movement in the horizontal direction from the 3/4 and 5/6 leg of the H pattern to the 7/8 and 9/10 leg of the H pattern signifies a shift from the low range to the high range of the transmission. As discussed above, manual splitter shifting is accomplished in the usual manner by means of a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 2. Range shift devices of this general type are known in the prior art and may be seen by reference to U.S. Pat. Nos. 3,429,202; 4,455,883; 4,561,325 and 4,663,725, the disclosures of which are incorporated herein by reference. Manually operated splitter and range shift actuators are known in the prior art and may be seen by reference to U.S. Pat. Nos. 5,193,410; 5,199,314 and 5,329,826, the disclosures of which are incorporated herein by reference.

Figure 5:
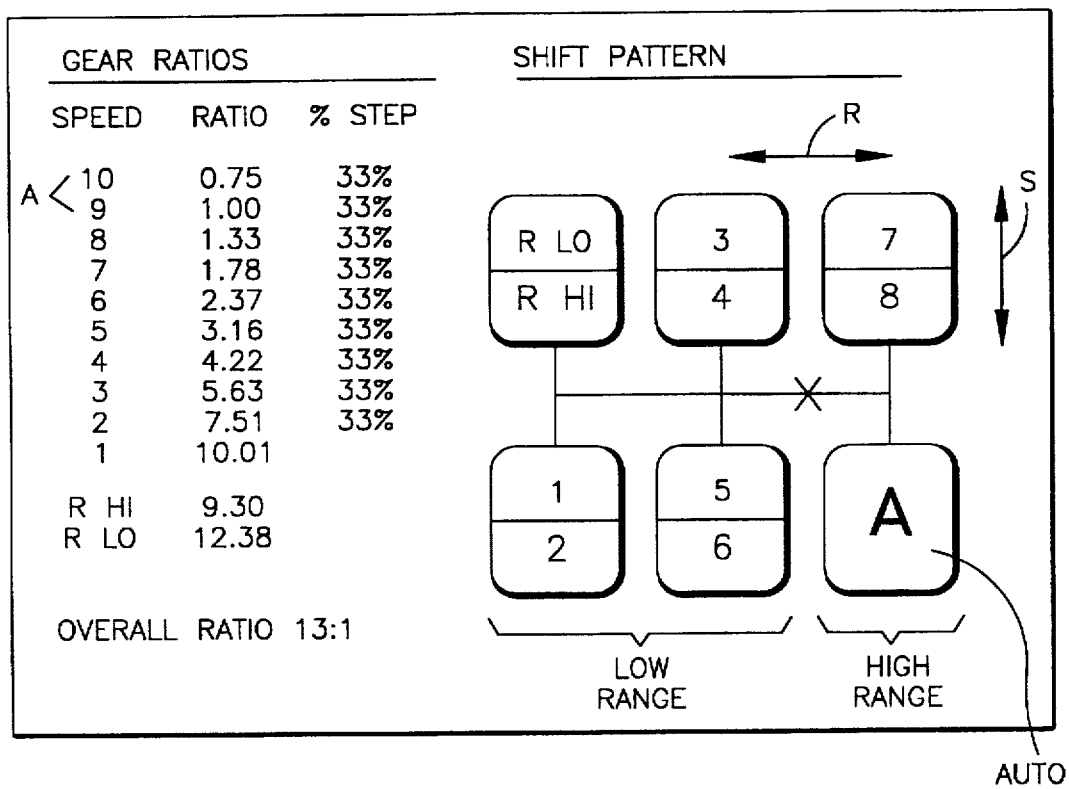
FIG. 5 is a schematic illustration, similar to FIG. 2, of the shift pattern and ratio steps for the transmission system of FIG. 3.

A partially automated vehicular mechanical transmission system 92 utilizing the control system of the present invention is illustrated in FIG. 3. Partially automated system 92 is of the type requiring manual shifting in the lower gear ratios (first through eighth) and, after initial manual selection of one of the upper two ratios, providing automatic shifting in the upper gear ratios (ninth and tenth), as described in aforementioned U.S. Pat. Nos. 4,722,248; 4,850,236; 5,038,027 and 5,393,276. The shift pattern for partially automated operation of the system 92 is schematically illustrated in FIG. 5.

The system includes a splitter control valve assembly 94 and a prime mover (such as diesel engine 96) driving the input shaft 18 of transmission 10 through a master friction clutch 98. The transmission 10 includes a shift lever 100 having a shift knob 102, which is associated with the shift bar housing 56 for manually shifting main section 12 and the range clutch 82 of auxiliary section 14.

A manually operated splitter valve 104, having a selector lever or button 106, is provided, usually on or integral with the shift knob, for manually shifting the splitter clutch 80. Splitter valve 104 is a 2-position, 3-way manually operated valve effective to selectively connect a first pilot conduit 108 to exhaust ("E$_x$") or to pilot pressure, respectively, to manually select either the high or low splitter ratio. The pilot pressure may be equal to supply pressure ("S") or to a lower value. In a typical onboard pneumatic system, supply is filtered, regulated air at about 60 to 80 psi.

The first pilot conduit 108 may fluidly communicate with a second pilot conduit 110 in series through the control valve assembly 94 of the present invention. The second pilot conduit 110 is effective to act on a 2-position, 3-way pilot valve 112, which is effective to normally vent or selectively pressurize a control chamber 114 of the splitter piston/cylinder actuator assembly 86. Chamber 114 is exposed to the larger area face 116 of a differential area piston 118 having a smaller area face 120 constantly exposed to supply pressure in biasing chamber 122. As is known, a spring may be utilized in place of or in combination with smaller area piston face 120 to bias piston 118 rightwardly, as seen in FIG. 3.

As may be seen, when pilot conduit 110 is exhausted, pilot valve 112 will connect control chamber 114 to exhaust, and supply pressure acting on smaller area face 120 will cause shift fork 84 to move splitter clutch 80 to engage gear 76 for the low splitter ratio, and when pilot conduit 110 is pressurized, valve 112 will move against a bias to a position for pressurizing control chamber 114, causing the piston 118 to move leftwardly to cause splitter clutch 80 to engage gear 74 for the high splitter ratio.

Except for interposing the control valve assembly 94 in series between pilot conduits 108 and 110, the above-described components are structurally and functionally equivalent to components utilized to shift the manually shifted transmission of FIGS. 1, 1A and 2.

To provide the partially automated operation of system 92, a controller 124, preferably a microprocessor-based controller, is provided for receiving input signals 126 and for processing same according to predetermined logic rules to issue command output signals 128 to various system actuators, such as an engine fuel control 130 and a solenoid driver and fault detection unit 132. Controllers of this type may be seen by reference to U.S. Pat. Nos. 4,361,060 and 4,595,986, the disclosures of which are incorporated herein by reference. The program for controller 124 is stored on a computer-usable medium such as a floppy disk, hard drive, CD-rom, tape or other external or internal storage medium.

Sensors for sensing engine speed (ES) and/or input shaft speed (IS) and output shaft speed (OS) may be provided, as well as sensors for sensing engine fueling THL and solenoid faults SF, all of which provide input signals indicative thereof to the controller 124. With the clutch 98 engaged, input shaft speed may be assumed to equal engine speed.

As is known, the engine 96 may have a built-in controller 96A and/or may communicate with controller 124 by an electronic data link of the type conforming to SAE J-1922, SAE J-1939, ISO 11898 or the like. All or a portion of controller 124 may be defined by hardware and/or software associated with engine controller 96A. A sensor may be provided for providing a signal (GR) indicative of engaged gear ratio or gear ratio may be calculated and confirmed by dividing input shaft speed or engine speed by output shaft speed (GR=(IS or ES)/OS±error?).

The control valve assembly 94 of the present invention is interposed in series between the standard manual splitter shift selection valve 104 and the standard pilot valve 112/splitter actuator 86 and is operated in response to command output signals from controller 124. The assembly includes, in series, a first 2-position, 3-way solenoid-controlled valve 134 and a second 2-position, 3-way solenoid-controlled valve 136 and a solenoid driver and fault detection unit 132 operating in response to command output signals from the controller.

Valve 134 has an inlet 138 connected to pilot conduit 108 and two outlets 140 (connected to one inlet 142 of valve 136) and 144 (connected to exhaust). Valve 134 has a first normal or default position wherein inlet 138 is connected to outlet 140, and thus, to inlet 142 of valve 136, while outlet 144 of valve 134 is blocked. Valve 134 has a second or actuated position upon energizing the first solenoid S#1 wherein outlet 140 is connected to exhaust at outlet 144 and inlet 138 is blocked.

Valve 136 has two inlets 142 (connected to the outlet 140 of valve 134) and 146 (connected to the source of pressurized fluid) and an outlet 148 connected to the second pilot conduit 110 controlling the pilot valve 112. Valve 136 has a first normal or default position wherein inlet 142 is connected to outlet 148 and the inlet 146 from source pressure is blocked, and a second actuated position upon energizing the second solenoid S#2 wherein inlet 142 is blocked and source pressure at inlet 146 communicates with outlet 148 and pilot conduit 110.

The valve table for operation of the solenoid-operated valves is set forth in FIG. 4.

The controller 124 senses a manual splitter operation mode by sensing a shift bar condition GR other than AUTO (see FIG. 5). In this mode (i.e., gear ratios 1–8), the solenoid driver is commanded to de-energize both of the solenoids, and the valves 134 and 136 will assume the default positions thereof. Pilot conduit 108 will communicate with pilot conduit 110 through the valves 134 and 136, and the actuator 86 will be under the manual control of selector valve 104.

AUTO or not-AUTO mode conditions may be sensed by position sensors or by processing the ES and OS signals according to predetermined logic rules.

Upon sensing a manual shift to the AUTO position, the controller will cause the solenoid driver 132 to energize the first solenoid S#1 to create an automatic-only splitter situation, as valve 134 moves to its second position, wherein the pilot conduit 108 controlled by manual selector valve 104 is blocked at inlet 138, and thus, the series connection through port 140 to the pilot valve 112 is blocked. With valve 134 in the second or actuated position thereof, the manual selector 104 is ineffective to control pilot valve 112 or splitter actuator 86.

In the current example, ninth and tenth speeds are the AUTO mode gear ratios, while eighth speed is the "entry gear ratio." A shift or intent to shift into the AUTO mode is confirmed when either:

(1) gear ratio is the entry gear ratio, and (2) vehicle speed exceeds a first reference value ($REF_1$), followed by (3) a shift into neutral;

OR (1) vehicle speed exceeds the first reference value, and (2) gear ratio is one of the AUTO mode ratios.

The first reference value ($REF_1$) is an output shaft speed at which a manual upshift from the entry gear is expected to occur, usually about the minimum output shaft speed at which an upshift from the entry gear is expected to occur.

When in the AUTO mode of operation, manual control 104 is bypassed and, based upon vehicle speed as indicated by the output shaft speed OS and/or the other sensed parameters, the control 124 will automatically determine if an automatic upshift from ninth to tenth or an automatic downshift from tenth to ninth is required, and will control engine fueling and the second solenoid-controlled valve 136 to implement same. With valve 134 actuated and valve 136 in its normal or default position, pilot conduit 110 is exhausted at port 144 of valve 134, and pilot valve 112 will exhaust the control chamber 114 of the piston/cylinder assembly 86, causing the piston to urge the splitter clutch in the low splitter ratio direction. With the second solenoid-controlled valve 136 actuated, pilot conduit 110 is connected to source pressure through inlet 146 and outlet 148 of valve 136, regardless of the position of valve 134, and pilot valve 112 will cause control chamber 114 to be pressurized, causing the piston 118 to urge the splitter clutch in the high splitter ratio direction. Valve 134 may be deactivated whenever valve 136 is energized to reduce heat generation.

In addition to causing the splitter clutch to be properly positioned in the AUTO mode, controller 124 will also cause the engine to be properly fueled to disengage the existing splitter ratio and synchronized for engaging the target splitter ratio. Upon sensing an eighth-to-ninth upshift into AUTO mode, the engine will be caused to synchronize for the required main and splitter clutch engagement.

In the current example, continuing operation in the AUTO mode is confirmed when either:

(1) the confirmed gear ratio is an AUTO mode ratio (i.e., ninth or tenth), and (2) vehicle speed exceeds the first reference value ($OS*GR_{ENTRY} \geq$ the expected manual upshift RPM from the entry gear);

OR an AUTO mode shift (ninth-tenth, tenth-ninth) is in progress.

Upon sensing that a shift from AUTO mode has occurred, the controller 124 will cause solenoid driver 132 to deactivate both solenoids to return splitter control to the operator. In the current example, a not-AUTO mode condition is confirmed when either:

(1) an AUTO mode shift is not in progress, and (2) vehicle speed is less than a second reference value ($REF_2$), followed by (3) a shift into neutral;

OR (1) an AUTO shift is in progress, and (2) after a given period of time, engagement in an AUTO mode ratio cannot be confirmed;

OR engagement in a non-AUTO mode ratio is confirmed.

The first, immediately preceding example involves a downshift out of AUTO mode, while the second example involves an apparent operator shift to main section neutral during an AUTO mode shift event.

The system controller is provided with logic rules to properly respond to manual lever shifts from an AUTO mode ratio, i.e., the AUTO position corresponding to ninth or tenth speeds, into main section neutral. As indicated above, whenever a lever shift from an AUTO mode into neutral occurs with vehicle speed less than a second reference value (the vehicle speeds at which a downshift into the entry gear or into a lower gear ratio would be expected), the AUTO mode will be deactivated and the operator will have manual control of engine fueling and splitter shifting.

If a manual shift into main section neutral occurs from ninth gear (splitter direct), the driver will have manual control of engine fueling and:

(1) the splitter will be shifted into splitter overdrive if output shaft speed exceeds the 9–10 upshift value (usually a function of throttle position and/or operation of the engine brake);

(2) the AUTO mode will deactivate if vehicle speed is less than the second reference value; or (3) the splitter will remain in splitter direct if the output shaft speed indicates a speed greater than the expected downshift into entry ratio speed but less than the 9–10 upshift speed.

If a manual shift into main section neutral occurs from tenth gear (splitter overdrive), the driver will have manual control of engine fueling and:

(1) the splitter will remain in splitter overdrive if output shaft speed exceeds the 10–9 downshift value at current throttle position;

(2) the splitter will be shifted into splitter direct if output shaft speed is less than the 10–9 downshift value at current throttle position but greater than the expected value for a downshift into the entry gear ratio; or (3) the AUTO mode will be deactivated if output shaft speed indicates vehicle speed is less than said second reference value.

In causing synchronous conditions for engagement of a target gear ratio, the engine is commanded to assume a rotational speed equal to true synchronous speed ($ES = OS*GR_T$) plus or minus an offset value X equal to about 30 to 50 RPM. Accordingly, the engine is alternately commanded to a speed ($ES=(OS+X)*GR_T$), and then a speed ($ES=(OS-X)*GR_T$).

To confirm engagement/non-engagement, the value of ES/OS is compared over a period of time to known gear ratios plus or minus a given percent Y (such as 0.5 to 1.5%). Thus, by way of example, over a period of time, if $ES/OS = GR*(1 \pm Y\%)$, then confirmation of engagement of GR is true. The offset X and the percentage error Y are selected so that at ES=(OS+X)*GR$_T$, or at ES=(OS-X)*GR$_T$, ES/OS will not equal GR*(1±Y%).

The foregoing, as discussed in aforementioned co-pending U.S. Pat. application Ser. No. 08/649,829, allows the use of speed signals to confirm engaged and neutral conditions without false readings due to engine synchronizing.

To confirm disengagement (of the entry gear ratio or of one of the AUTO mode ratios), the quotient of ES/OS is compared to the numerical value of the disengaging gear, plus or minus a disengaging gear error value, which may exceed the magnitude of the gear error value used to confirm engagement. For example, the disengaging gear error value may equal 1.5%, while the engaging gear error value may equal 1%.

Additionally, the gear error value used for confirming disengagement may be set larger on the positive side of synchronous of the disengaging gear than on the negative side to minimize false indications of neutral. Speed separations while still in gear tend to be higher on the positive side of synchronous due to the higher driving torque (the engine driving the vehicle tends to produce a greater positive torque magnitude than the negative torque produced when coasting with the vehicle driving the engine). Providing a larger Pos_Disengage_Gear_Error and a smaller Neg_Disengage_Gear_Error allows for protection against false indications of neutral on the positive side caused by aggressive throttle application, while still providing for a quick confirmation of neutral in the negative direction (the direction in which neutral is confirmed on most shifts).

Figure 6:
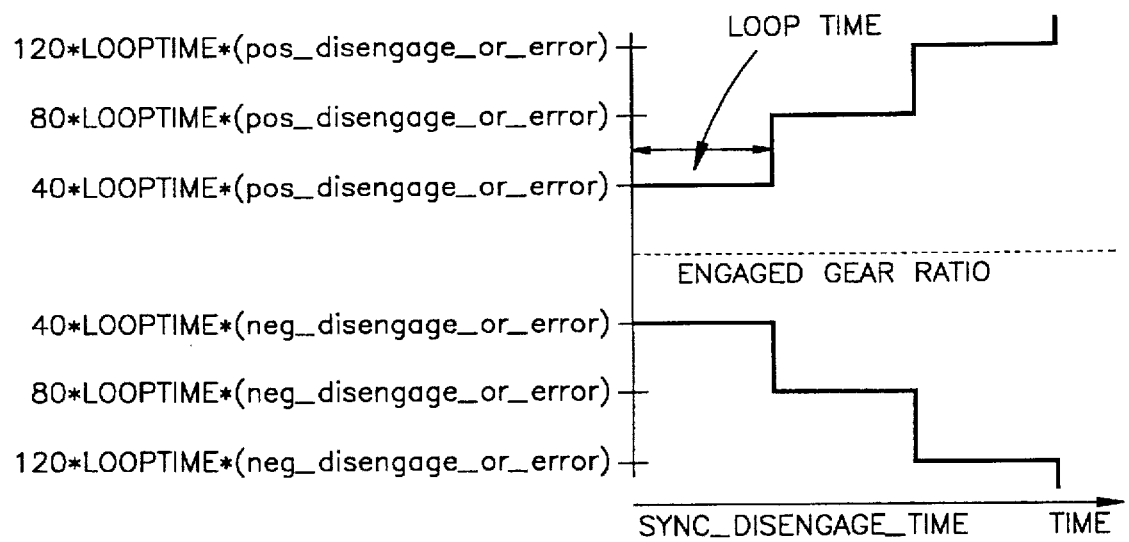
FIG. 6 is a graphical representation of the disengagement confirmation logic of the system of FIG. 3.
Figure 7:
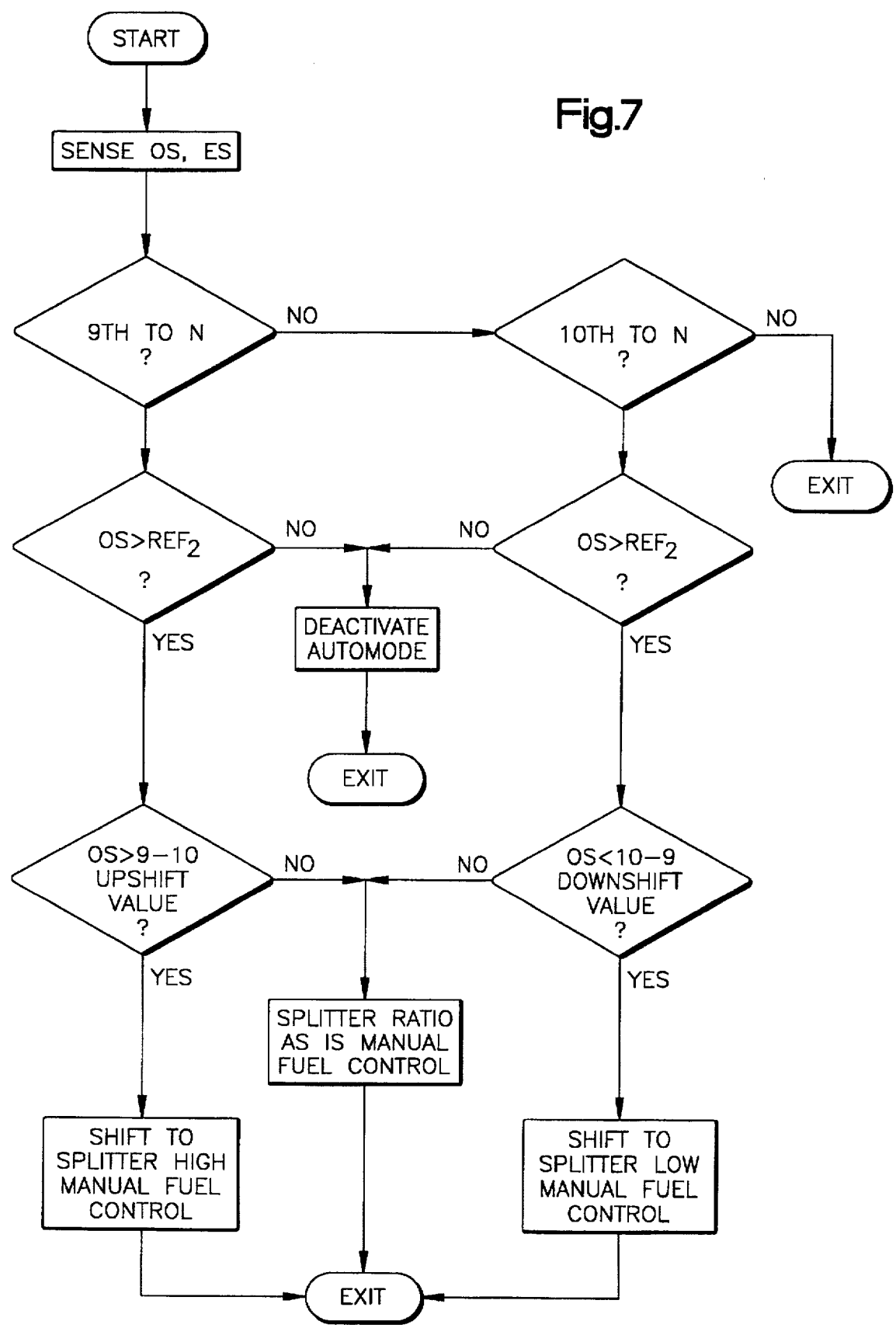
FIG. 7 is a schematic illustration, in flow chart format, of the control of the present invention.

In the preferred embodiment, the calculated gear ratio, ES/OS, is compared to an expanding window of error values and will be confirmed as disengaged only if it continues to remain outside the window. In the current example (see FIG. 6), the calculated gear ratio must fall outside a range from:

[Engaged GR*(1−(40*Counter*Loop_Time*Neg_Disengage_Gear_Error))]

to

[Engaged GR*(1+(40*Counter*Loop_Time*Pos_Disengage_Gear_Error))], where Counter is incremented by one each time this is true and decremented each time this is not true (minimizing at a value of 1). Disengagement is confirmed when the Counter reaches or exceeds a value equal to (Synch_Disengage_Time/Loop_Time). In the preferred embodiment, the values of Neg_Disengage_Gear_Error=1%, Pos_Disengage_Gear_Error=1.5%, and the maximum value of (40*Counter*Loop_Time)=6.

The advantage of this "expanding window" over a fixed error band (prior art) is that it allows disengagement confirmation to start sooner (using the relatively small initial error window) while simultaneously providing better protection against false confirmations of neutral (using the relatively large, fully expanded window before confirming). If the calculated gear ratios fall back within the window during the disengagement confirmation process, the window will decrement to the next smaller value (or to the smallest window) and upon the calculated gear ratio falling outside the window, the disengagement process will continue. The advantage gained with this "contracting window" over immediately resetting to the smallest error window is that it maintains a quick confirmation of true disengagement even if one data point falls inside the expanding error bounds, while preventing false neutral confirmation with transient speed separations induced by large torque oscillations.

Upon an electrical power failure, the solenoid-controlled valves will return to the open positions thereof, fluidly connecting conduits 108 and 110, and allowing manual selection of all ten forward ratios. Upon the solenoid driver detecting conditions indicative of a failure at one or both solenoids, the controller will cause both solenoids to be de-energized again, causing the two valves 134 and 136 to assume the open positions thereof, and allow manual selection of all ten forward ratios.

The control valve assembly 94, thus, provides a control allowing both manual and automatic splitter shifting, provides a favorable failure mode and as a module requires only four additional fluid connections (conduit 108 to port 138, conduit 110 to port 148, source S to port 146 and exhaust E$_x$ to port 144) to the normally utilized manual splitter control.

As used herein, "main section" ratio positions will include the 1/2, 2/3, 3/4, 5/6, 7/8 and 9/10(A) ratio positions, and the range section is considered a portion of the manually shifted main section. The main section is considered to include all ratios other than the automated splitter section.

As the range section is manually shifted, the range gearing is considered a portion of the main section for purposes of this invention, and the forward main section ratio positions are 1/2, 3/4, 5/6, 7/8 and 9/10(A).

Accordingly, it may be seen that an improved compound transmission and shift control unit has been provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A vehicular, partially automated mechanical transmission system (92) comprising a splitter-type mechanical transmission (10) having a splitter-type auxiliary section (14) having a splitter-high ratio (overdrive) and a splitter-low ratio (direct) connected in series with a manually shifted main transmission section (12), said system including a system controller (124) for receiving input signals indicative of at least engine speed and transmission output shaft speed and for processing same according to predetermined logic rules to issue command output signals to system actuators including an engine fuel controller (130) and a splitter shift controller (112), said system controller effective to cause automatic splitter shifting upon a manual shift into the highest main section ratio, said engine fuel controller and said splitter shift controller each having a first mode of operation wherein operation is in accordance with manual control signals and a second mode of operation wherein operation is in accordance with command output signals from said system controller, said system characterized by said logic rules including rules effective:

(a) if a manual shift into main section neutral occurs from the highest main section ratio/splitter-low ratio position, the engine fuel control is caused to operate in the first mode thereof, and:

(i) the splitter will be shifted into the splitter-high ratio if output shaft speed exceeds a first reference value;

(ii) the splitter control is caused to operate in the first mode if output shaft speed is less than a second reference value; or (iii) else the splitter will be retained into the splitter-low position.

2. The transmission system of claim 1 wherein said logic rules additionally comprise rules effective:

(b) if a manual shift into main section neutral occurs from the highest main section ratio/splitter-high position, engine fuel control is caused to operate in the first mode thereof; and:
  (i) the splitter will be shifted into splitter low if output shaft speed is less than a third reference value but greater than said second reference value, said third reference value greater than said second reference value;
  (ii) the splitter control is caused to operate in the first mode if output shaft speed is less than a second reference value; or else
  (iii) the splitter will be retained in the splitter-high ratio.

3. The transmission system of claim 1 wherein said first reference value corresponds to an output shaft speed at which an upshift from the highest main section ratio/splitter-low ratio will be expected to occur.

4. The transmission system of claim 2 wherein said first reference value corresponds to an output shaft speed at which an upshift from the highest main section ratio/splitter-low ratio will be expected to occur.

5. The transmission system of claim 1 wherein said second reference value corresponds to an output shaft speed at which a downshift from the highest main section ratio/splitter-low ratio will be expected to occur.

6. The transmission system of claim 2 wherein said second reference value corresponds to an output shaft speed at which a downshift from the highest main section ratio/splitter-low ratio will be expected to occur.

7. The transmission system of claim 3 wherein said second reference value corresponds to an output shaft speed at which a downshift from the highest main section ratio/splitter-low ratio will be expected to occur.

8. The transmission system of claim 2 wherein said third reference value corresponds to an output shaft speed at which a downshift from the highest main section ratio/splitter-high ratio is expected to occur.

9. The transmission system of claim 4 wherein said third reference value corresponds to an output shaft speed at which a downshift from the highest main section ratio/splitter-high ratio is expected to occur.

10. The transmission system of claim 5 wherein said third reference value corresponds to an output shaft speed at which a downshift from the highest main section ratio/splitter-high ratio is expected to occur.

11. A method for controlling a vehicular, partially automated mechanical transmission system (92) comprising a splitter-type mechanical transmission (10) having a splitter-type auxiliary section (14) having a splitter-high ratio (overdrive) and a splitter-low ratio (direct) connected in series with a manually shifted main transmission section (12), said system including a system controller (124) for receiving input signals indicative of at least engine speed and transmission output shaft speed and for processing same according to predetermined logic rules to issue command output signals to system actuators including an engine fuel controller (130) and a splitter shift controller (112), said system controller effective to cause automatic splitter shifting upon a manual shift into the highest main section ratio, said engine fuel controller and said splitter shift controller each having a first mode of operation wherein operation is in accordance with manual control signals and a second mode of operation wherein operation is in accordance with command output signals from said system controller, said method comprising:

(a) if a manual shift into main section neutral occurs from the highest main section ratio/splitter-low ratio position, causing the engine fuel control to operate in the first mode thereof, and:
  (i) causing the splitter to be shifted into the splitter-high ratio if output shaft speed exceeds a first reference value;
  (ii) causing the splitter control to operate in the first mode if output shaft speed is less than a second reference value; or else
  (iii) causing the splitter to be retained into the splitter-low position.

12. The method of claim 11 additionally comprising:
(b) if a manual shift into main section neutral occurs from the highest main section ratio/splitter-high position, causing engine fuel control to operate in the first mode thereof; and:
  (i) causing the splitter to be shifted into splitter low if output shaft speed is less than a third reference value but greater than said second reference value, said third reference value greater than said second reference value;
  (ii) causing the splitter control to operate in the first mode if output shaft speed is less than a second reference value; or else
  (iii) causing the splitter to be retained in the splitter-high ratio.

13. The method of claim 12 wherein said first reference value corresponds to an output shaft speed at which an upshift from the highest main section ratio/splitter-low ratio will be expected to occur.

14. The method of claim 12 wherein said first reference value corresponds to an output shaft speed at which an upshift from the highest main section ratio/splitter-low ratio will be expected to occur.

15. The method of claim 11 wherein said second reference value corresponds to an output shaft speed at which a downshift from the highest main section ratio/splitter-low ratio will be expected to occur.

16. The method of claim 12 wherein said second reference value corresponds to an output shaft speed at which a downshift from the highest main section ratio/splitter-low ratio will be expected to occur.

17. The method of claim 13 wherein said second reference value corresponds to an output shaft speed at which a downshift from the highest main section ratio/splitter-low ratio will be expected to occur.

18. The method of claim 12 wherein said third reference value corresponds to an output shaft speed at which a downshift from the higest main seciton ratio/splitter-high ratio is expected to occur.

19. The method of claim 14 wherein said third reference value corresponds to an output shaft speed at which a downshift from the higest main seciton ratio/splitter-high ratio is expected to occur.

20. The method of claim 15 wherein said third reference value corresponds to an output shaft speed at which a downshift from the higest main seciton ratio/splitter-high ratio is expected to occur.

* * * * *